United States Patent [19]

Jansson et al.

[11] 4,238,085
[45] Dec. 9, 1980

[54] FIXED-SPOOL REEL

[75] Inventors: Bertil E. Jansson, Karlshamn; Karl L. O. Carlsson, Asarum, both of Sweden

[73] Assignee: ABU Aktiebolag, Svangsta, Sweden

[21] Appl. No.: 913,144

[22] Filed: Jun. 6, 1978

[30] Foreign Application Priority Data

Jun. 9, 1977 [SE] Sweden ............................ 7706721

[51] Int. Cl.³ .............................................. A01K 89/01
[52] U.S. Cl. ........................ 242/84.2 G; 242/84.21 R
[58] Field of Search ................... 242/84.2 G, 84.21 R

[56] References Cited

U.S. PATENT DOCUMENTS

| 2,745,607 | 5/1956 | Taggart et al. | 242/84.21 R |
| 2,863,617 | 12/1958 | Chapin et al. | 242/84.21 R |
| 2,971,720 | 2/1961 | Wood | 242/84.21 R |
| 3,586,255 | 6/1971 | Monthulet | 242/84.21 R |
| 3,627,223 | 12/1971 | Monthulet | 242/84.2 G |

FOREIGN PATENT DOCUMENTS

1124422  7/1956  France ............................... 242/84.2 G

Primary Examiner—Billy S. Taylor
Attorney, Agent, or Firm—Karl W. Flocks

[57] ABSTRACT

A fishing reel of the type having a line spool which during casting is non-rotating and from which the fishing line is unwound in a substantially axial direction, a bail support member rotatable by means of a hand crank, a bail means pivotally mounted on the support member to be rotated therewith, the bail means being movable against spring action from an active position for winding up the line on the line spool to an inactive position in relation to the line for permitting undisturbed unwinding of the line during casting, a releasable latching mechanism for automatically and releasably locking the bail means in its inactive position and for automatically and releasably locking said rotatable bail support member to prevent pivoting of the bail and unintentional rotation of the rotatable member, respectively, during casting. The latching mechanism comprises first engagement means on said body, second engagement means supported by and movable with said bail means, and an engaging member for cooperation with the first and second engagement means, said engaging member being movably supported by the rotatable bail support member, means for moving the engaging member from an unengaged position to an engaging position with the first and second engagement means when the bail means is pivoted to its inactive position, and releasing means supported by a stationary portion of the fishing reel for returning said engaging member to said unengaged position when the rotatable bail supporting member is rotated by the hand crank, whereupon the bail means will be returned by spring action to its active position for winding up the line on the line spool.

2 Claims, 14 Drawing Figures

FIXED-SPOOL REEL

The present invention relates to fishing reels and more particularly to a fishing reel of the type in which the fishing line during each cast is unwound in an axial direction from a non-rotary line spool and which as means for winding up the line on the line spool has a rotatable bail which is pivotable to an open, non-active position for casting and is automatically pivoted back to its active position when the hand crank is actuated for winding up the line.

One of the major objects of the present invention is to provide a fishing reel with an automatically operated bail latching and returning mechanism having a reliable, relatively simple and enclosed, well-protected construction for locking the bail in its inactive position and for returning the bail to its active position when the hand crank is rotated, and, a further object is to provide a mechanism of this kind and which will operate without producing any disturbing noise and which embodiment is also capable of releasably catching the rotatable bail support member against any unintentional rotation in order thereby to facilitate casting.

Thus, a fishing reel according to this invention having a body, a line spool which during casting is non-rotating and from which the fishing line is unwound in a substantially axial direction, a hand crank, a rotatably mounted bail support member connected via a transmission means to the hand crank to be rotated thereby, a bail means pivotally mounted on said support member to be rotated therewith, spring means acting on said bail means, said bail means being movable against the action of said spring means from an active position for winding up the line on the line spool when said support member is rotated by the hand crank to an inactive position in relation to the line for permitting undisturbed unwinding of the line during casting, a releasable latching mechanism for automatically and releasably locking said bail means in its inactive position and for automatically and releasably locking said rotatable bail support member when said bail means is pivoted to its inactive position, wherein said latching mechanism comprises first engagement means on said body, second engagement means supported by and movable with said bail means, and an engaging member for cooperation with said first and second engagement means, said engaging member being movably supported by said rotatable bail support member, means supported by said bail means for moving said engaging member from an unengaged position to an engaging position with said first and second engagement means when said bail means is pivoted to its inactive position, and releasing means supported by said body for returning said engaging member to said unengaged position when said rotatable bail supporting member is rotated by the hand crank.

Another object of the invention is to provide a fishing reel which is equipped with a gently and smoothly operating spool shaft brake and in which the hand crank may readily be shifted from right-hand to left-hand turning or vice versa, and by a simple operation can be pivoted or folded from normal active position to a withdrawn rest position.

These and other objects and advantages of the invention will be apparent to those versed in the art in the following description with reference to the accompanying drawings in which.

Figures 1, 3, 4:
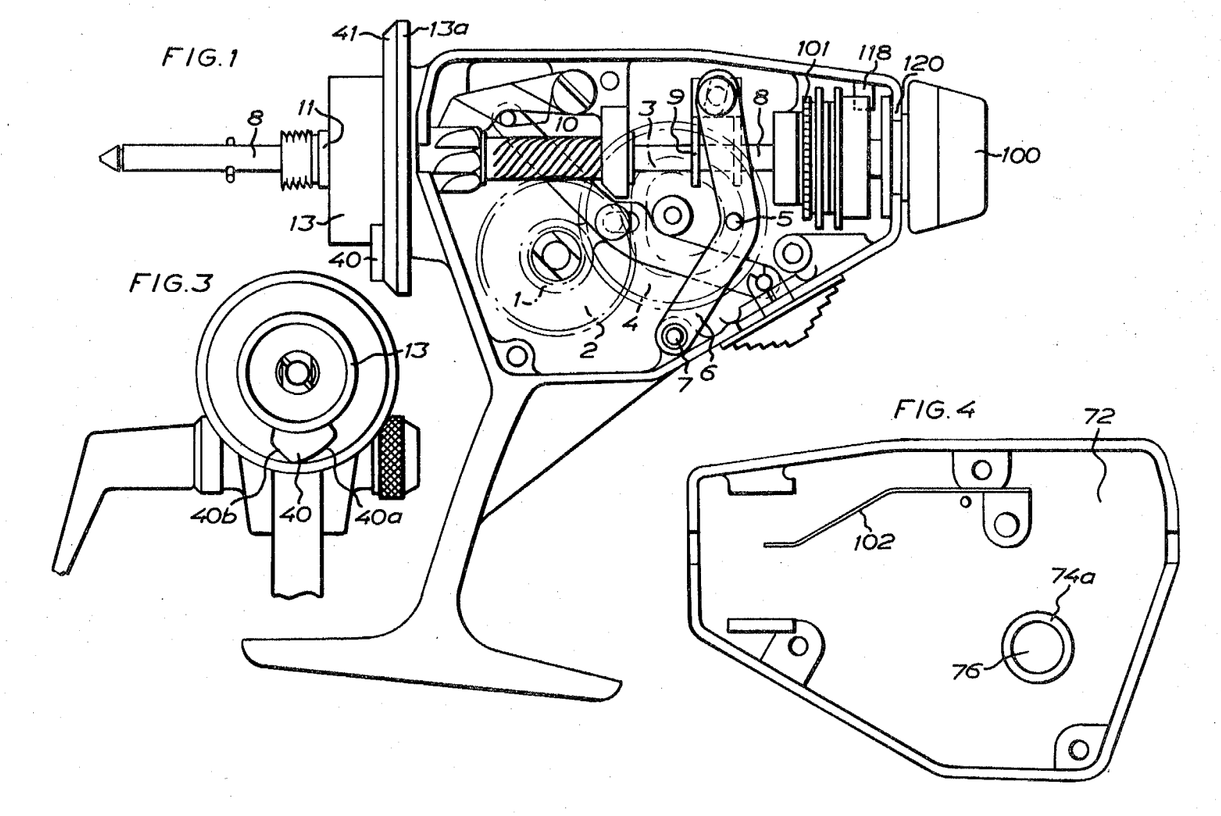
FIG. 1 illustrates a fishing reel according to the present invention as seen in side elevation, the reel housing cover, the spool and the rotatable line winding mechanism being removed.
FIG. 3 illustrates the reel of FIG. 1 as seen from in front.
FIG. 4 shows the inner side of the reel housing cover removed from the reel of FIG. 1.
Figure 2:
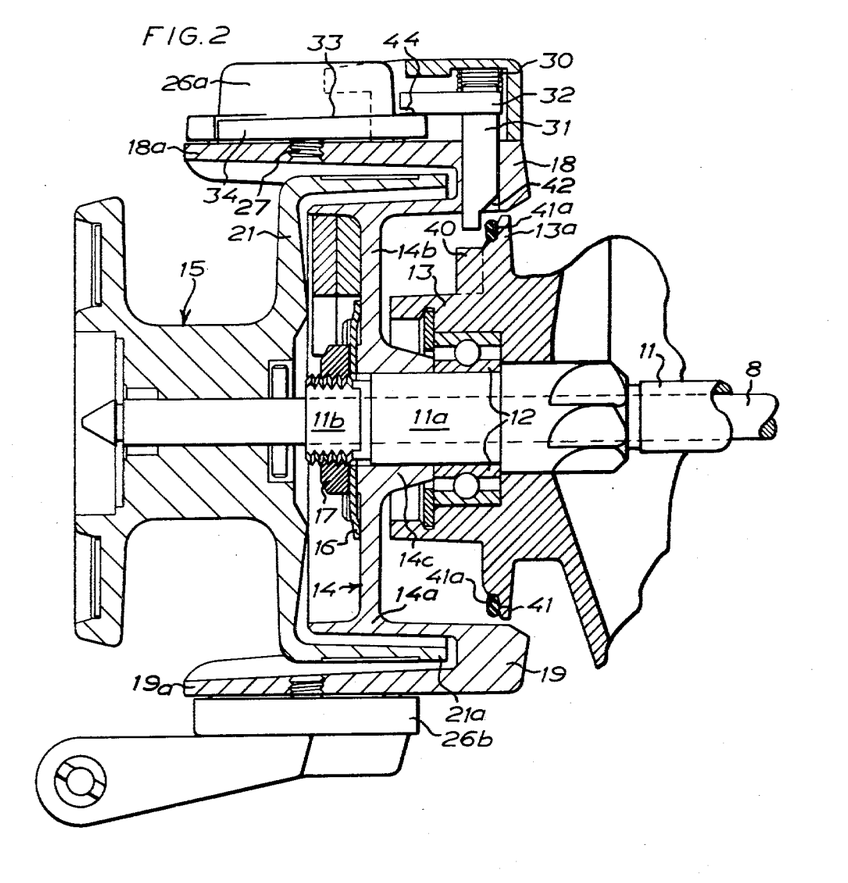
FIG. 2 illustrates in axial section and on a greater scale the front portion of the reel, the spool, the line winding mechanism being mounted.

The drive mechanism for the rotatable parts of the fishing reel shown in FIG. 1 has a construction substantially similar to the drive mechanism comprising a cam-controlled line spreading device which is the subject matter of U.S. Pat. No. 4,114,825. The gear wheels 1, 2 mounted on the same shaft are driven by means of the hand crank (not shown in FIG. 1). The gear wheel 1 drives, by a gear wheel 4, the cam curve 3 of the line spreading device. The cam curve 3 which, in this instance, is designed on the gear wheel 4 drives, via a cam follower pin 5, the line spreading lever 6 in an oscillatory movement about a pivot 7, the lever 6 thereby reciprocating the line spool shaft 8 by a dog 9. The gear wheel 2 which is in the form of a worm gear engages a worm screw 10 on a rotatable hollow shaft 11 through which the shaft 8 extends. As shown in FIG. 2, the shaft 11 is mounted with a front end portion 11a in a bearing 12 mounted in a front portion 13 of the reel body. On the front end portion 11a of the shaft 11 there is mounted a rotatable bail supporting member 14 which as shown in FIG. 2 may form a housing for at least the rear portion of the spool 15 and therefore may be referred to hereinbelow as a "spool housing". As shown in FIG. 2, the spool housing 14 comprises a cylindrical outer wall 14a which via a radial wall 14b is formed integral with a hub 14c. The spool housing 14 is mounted on a cylindrical front end portion 11a of the hollow shaft 11 and is secured to the shaft by being clamped by means of a washer 16 and a nut 17 against an adjacent end of the inner ball race of the bearing 12. The outermost portion of the shaft 11 has two planar surfaces 11b and the washer 16 has an opening of suitable configuration for ensuring a drive connection between the shaft 11 and the rotatable spool housing 14.

Figure 5:
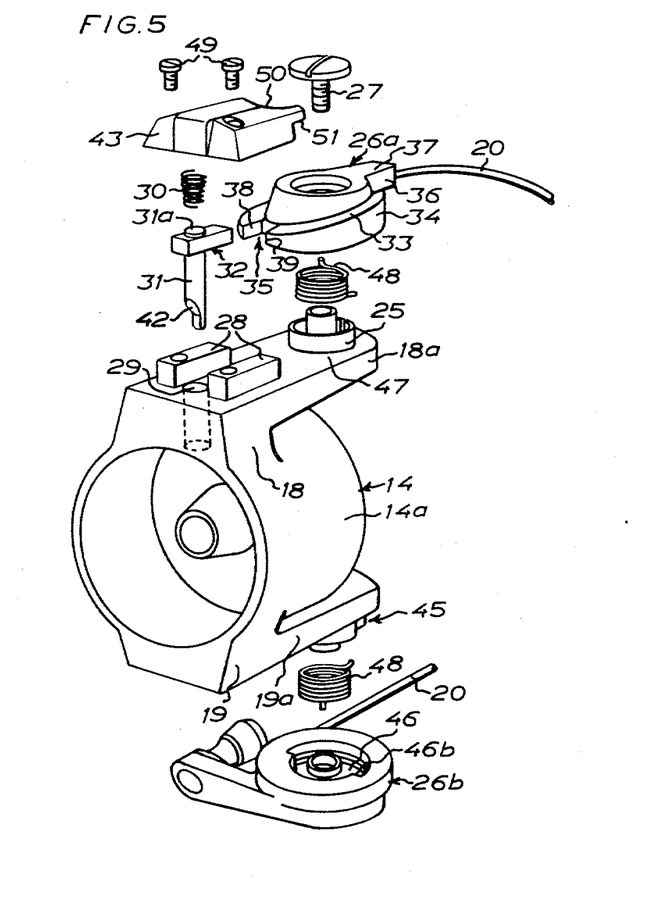
FIG. 5 is an exploded perspective view showing the components of the rotatable line winding mechanism including the bail.
Figure 8:
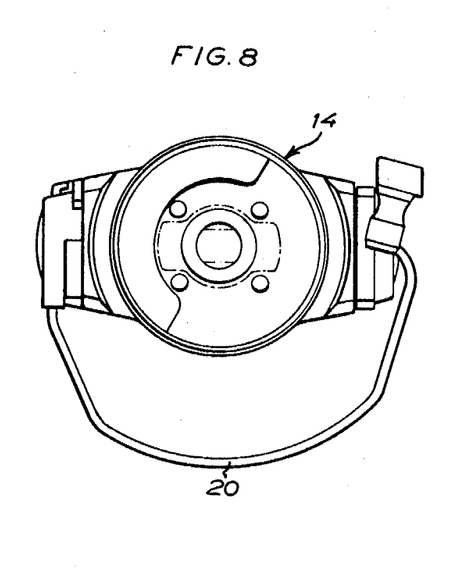
Figure 12:
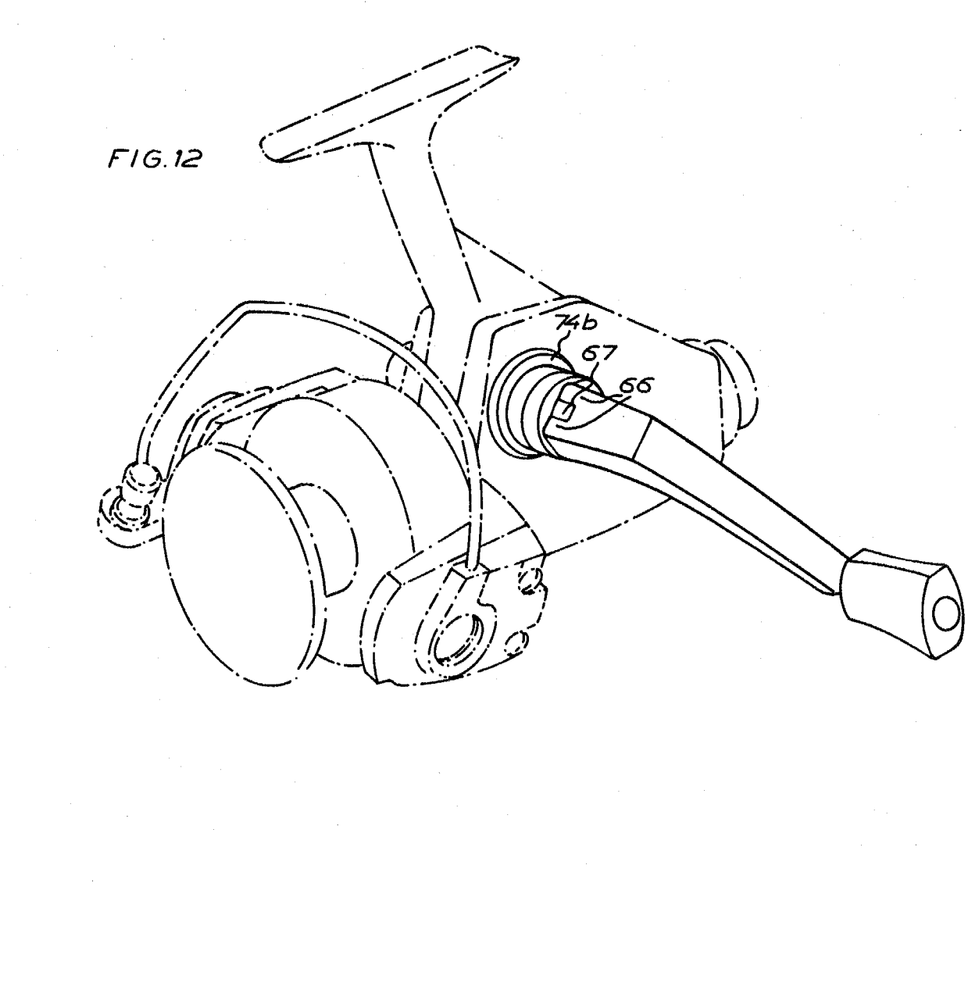
FIG. 12 shows the hand crank when mounted on the reel.

On the rear portion of the cylindrical wall member 14a of the spool housing 14, there are supported two mutually diametrically located, radially protruding portions 18, 19, each of which has an axially forwardly directed portion 18a and 19a, respectively, these two portions 18a, 19a forming holders for the bail 20 (see FIGS. 5, 8 and 12).

The rear end wall 21 of the spool 15 has an axially rearwardly directed flange 21a which with play surrounds a corresponding portion of the spool housing 14 and is surrounded, also with play, by the forwardly directed portions 18a, 19a of the projections 18 and 19, respectively.

When the spool housing 14 is rotated by means of the hand crank, the spool 15 is non-rotating but reciprocated on the shaft 8 and the bail holders 18a, 19a are rotated about the rear portion of the spool 15.

Figure 7:
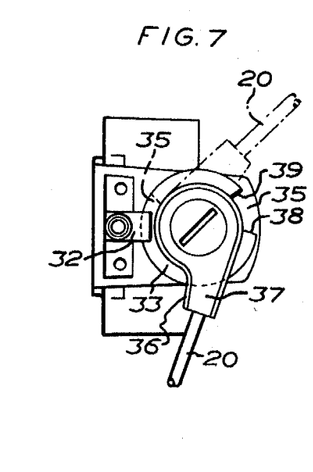
FIGS. 7 and 8 are a side view and an end view, respectively, of the front part of the reel shown in FIG. 2, the spool being removed.

One bail holder 18a which with respect to FIGS. 2 and 5 may be referred to as the upper bail holder, carries on a cylindrical collar 25 an annular member rotatably mounted on the collar 25 and forming a bail mounting 26a (see FIG. 5) which is maintained on the collar 25 by a screw 27. The bail holder 18a supports or is formed with two parallel guides 28 and, in the region between these guides, a cylindrical bore 29 is formed in and extends through the portion 18 of the bail holder and through the wall 14a of the spool housing. In the bore 29 and between the guides 28, there are provided releasable bail locking means in the form of a pin 31 biased by a spring 30 and having a head 32 which has two planar, opposite sides for guiding the head 32 between the guides 28 when the locking means 31, 32 are in position with the pin shaft 31 extending into the bore 29. The pin head 32 serves as a cam follower for cooperation with a cam surface 33 on a flange 34 of the bail mounting 26a. The curve of the cam surface 33 has been obtained by gradually increasing the height of the flange 34 from a substantially radial recess at 35 formed in the flange, to a shoulder surface 36 where the cam surface 33 terminates at a projection 37 to which one end of the bail 20 is fixed. The recess 35 is so designed that when the bail 20 is pivoted from its active position (winding position) to an open position (casting position), it permits the head 32 to be received in the recess in a locking position, in which the pin head 32 is located between the opposite sides 38, 39 of the recess. In FIG. 7 is shown by full lines the position of the locking head/cam follower 32 bearing on the cam surface 33 for cooperation therewith, and by dash-dot lines is shown the position of the recess 35 when the bail is pivoted to its inactive position, in which the bail normally is retained by the spring biased head 32. In a radially inner position in the bore 29, the pin 31 extends into the spool housing 14 and the relative path of movement of a cam means 40 having a radially inclined cam surface (see FIGS. 2 and 3) which is supported on the inner radial side of an annular flange 13a of the body portion 13. The flange 13a has a substantially conical outer edge portion 41 in which is formed a recess for receiving an O-ring 41a of frictional material. The end portion of the pin 31 has a mating bevelled surface 42 which in the radially inner position (not shown) of the pin bears on the O-ring 41a. When the bail 20 is pivoted to its inactive position, the pin 31 is displaced by the action of the spring 30. As shown in FIG. 2 this spring may have the form of a small conical helix mounted on the pin between the head 32 and a cover 43 (which will be described in greater detail below). When the pin 31 is displaced to its inner end position, the pin will prevent unintentional rotating movement of the member 14 and will at the same time, with its head 32, hold the bail locked in its inactive position. When the member 13 is rotated by the hand crank of the reel, the inclined cam surface on the cam means 40 will contact the inner end of the pin 31 and thereby move the pin against the action of the spring 30, radially outwardly to a position in which the cam surface 33 on the flange 34 can be moved in under the pin head 32 thereby permitting the bail to be pivoted to its active position. This pivotal movement of the bail is arrested by engagement of a locking stud 45 on the lower bail holder 19a (FIGS. 2 and 5) in a recess 46 formed in the lower bail mounting 26b (FIG. 5). When the bail 20 is in the lowered position, the locking stud 45 abuts on a substantially radial shoulder surface 46b which defines the radially widened recess 46 for the locking stud 45.

As shown in FIG. 2, the pin head 32 may have an undercut edge recess 44 with a sliding surface for cooperating with a mating surface (not shown) on the bail holder 26a during pivotal movement of the bail which, when pivoting to its inactive position, in a conventional manner actuates a pair of return springs 48 which are disposed in a known manner in spacings between each bail holder 18a and 19a and the respective bail mounting 26a, 26b.

These return springs 48 are preferably helical springs mounted on the bail holders and disposed in cavities in the bail mountings, the respective spring being fixed at opposite ends, one to the members 45 and 46 and the other to the members 25 and 34.

It should be noted that the pin 31 (FIG. 2), when the bail 20 is pivoted back to its active position, will slide with its head 32 in contact with the cam curve 33 and will be gradually displaced radially outwardly against the action of the spring 30. Thus, the automatically effected pivoting movement of the bail back to its active position by rotating the hand crank will be subjected to a braking force by interengagement between the head 32 and the sloping cam surface 33. This returning movement will therefore be effected gently while avoiding that the returning of the bail produces a disturbing slamming noise, which is generally the case with automatic returning of bails in fishing reels of this type.

Another important advantage of the above-described arrangement is that the releasable member 31/32, that is the pin 31 and its head 32, when the bail is pivoted to its inactive position, that is the open casting position, is brought to a locking position with the specially formed end portion 42 of the pin 31 in frictional engagement with the O-ring 41a on the annular stationary flange 13a, thereby latching the rotatable bail supporting member 14. When the bail is in its open inactive position and a cast shall be effected, it will thus not be necessary to immobilise the bail and the rotatable bail supporting member 14 with the hand.

As is evident from the above description and from FIGS. 2 and 5, all the parts of the mechanism for automatically pivoting the ball 20a are well-protected by their built-in or enclosed construction. Over the pin head 32, which is guided between the guide members 28, the above-mentioned cover 43 is fixed to the guide members 28 by a pair of screws 49 screwed into threaded holes in the members 28. The cover 43 has a cylindrical recess on the side facing the bail supporting member 14 for receiving the spring 30 which at its radially inner end engages with and is retained on a guide pin 31a projecting from the pin head 32 and which, at its base end, bears on the bottom surface of the recess in the cover 43. The configuration of the spring also affords the advantage that the spring can be expanded to a relatively great length with respect to its relatively insignificant length when being in the compressed, tensioned state (shown in FIG. 2), this position corresponding to the active position of the bail 20. As shown in FIG. 5, the cover 43 has, on the side facing the bail mounting 26a, a circular surface 50 and an undercut recess 51 so as not to prevent the rotational movement of the bail mounting for pivoting the bail 20 between its active and inactive positions.

As is shown in FIG. 3, the cam means 40 on the frame or body portion 13 has two opposite, oblique cam surfaces 40a, 40b. Both of these inclined cam surfaces can produce returning of the bail 20 to its active position by displacing the pin 31 radially outwardly, which means that the bail can also be returned to its active position in case of an incorrect turning of the hand crank, that is, in a backwardly direction. Generally, this is an advantage, since it is hereby avoided that the pin 31 is damaged, which might be the case if the cam means 40, in connection with an incorrect rotational direction of the bail supporting member, hits the pin 31 with an abutment (shoulder) surface and not with its sloping cam surface.

Figure 6:
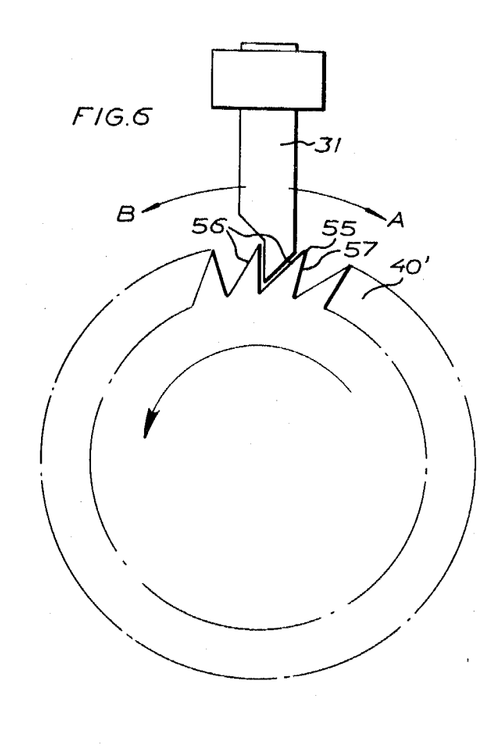
FIG. 6 schematically shows a modification of the device for latching and releasing the rotatable winding mechanism.

Instead of using only one cam member 40, it is possible to use several such cam members, whereby the member 14 need not be rotated through an entire revolution for effecting the returning of the bail to its active position. In using for instance three cam members 40, it is thus possible to return the bail after only a third of a revolution, and it is even possible, instead of resorting to one or a few cam members 40, to use a toothed ring 40' (FIG. 6) provided with, for example, serrated teeth 55 on the stationary portion 13. For the same reasons as outlined above with respect to the two cam surfaces 40a, 40b on the cam member 40, the teeth 55 of the toothed ring 40' may be so designed as to return the pin 31 radially outwardly when the bail supporting member 14 is in the right or wrong direction, but by using releasing cam members in the form of serrated teeth 55, one of the sloping flanks 56 of the teeth 55 can produce a radial displacement of the pin 31 on rotation of the member 14 and corresponding movement of the pin in the direction indicated by the arrow A, while the other tooth flanks 57 prevent movement of the pin 31 in the direction of the arrow B. In that the toothed ring 40' has several teeth and the pin in its radially inner position always engages in a tooth space, injurious blows on the end of the pin 31 are prevented since the rotatable bail support member 14 cannot, as in the embodiment of FIG. 3, be rotated any considerable angular distance before the pin is actuated by a cam surface (tooth flank surface).

As previously indicated, the member 14 can be rotated by means of the hand crank of the reel, the spool shaft 8 being at the same time reciprocated at a varying speed during each stroke, whereby the line can be wound on the spool 15 in a predetermined fashion in dependence upon the configuration of the cam curve 3. The gear wheels 1, 2 are driven by direct engagement of the hand crank with the common hub 60 of the gear wheels 1, 2 (see FIG. 9).

The hand crank 61 of the reel is adapted to be mounted optionally for right-hand or left-hand turning of the hand crank, and the hub 60 which is rotatably mounted in the reel frame is in the form of a sleeve, the opposite ends of which have identical recesses 62 for engaging a coupling pin 63 on the crank arm 64. The coupling pin 63 is in the form of a projection on a coupling piece 65 pivotally connected to the crank arm 64. The crank arm 63 has a fork-shaped end portion with two shanks 66 between which there is supported a rear, fork-shaped projection 67 on the coupling piece 65, the projection 67 having planar opposite sides. The coupling piece 65 is pivotally connected to the crank arm 64 in that one shank 67a of the projection 67 is connected with the fork shanks 66 of the crank arm by a pivot pin 68. As will appear from the following description, the pin 68 constitutes an articulation on which the crank arm can be folded to a compact condition of the reel.

The crank arm 64 and its coupling piece 65 are provided with bores 69, 70 which are coaxial with each other in the normal position of the crank arm with respect to the coupling piece, i.e. the position in which the coupling piece forms an extension of the crank arm 64. The bore 69 in the crank arm is threaded to permit screwing of a locking screw 71 which is inserted from the opposite side of the reel frame through a hole in the frame wall and through the hub 60 and by means of which the crank arm 64 with its coupling piece 65 can be fixedly mounted to the hub 60. In normal position, the gear wheels 1, 2 are mounted in the gear housing of the reel between opposing walls 72, 73, one of which is the lid 72 shown in FIG. 4, and in this position the hub is mounted with its ends in bearings or by means of bearing surfaces in sleeve-form sockets 74a, 74b in the walls 72, 73.

Figures 9, 10:
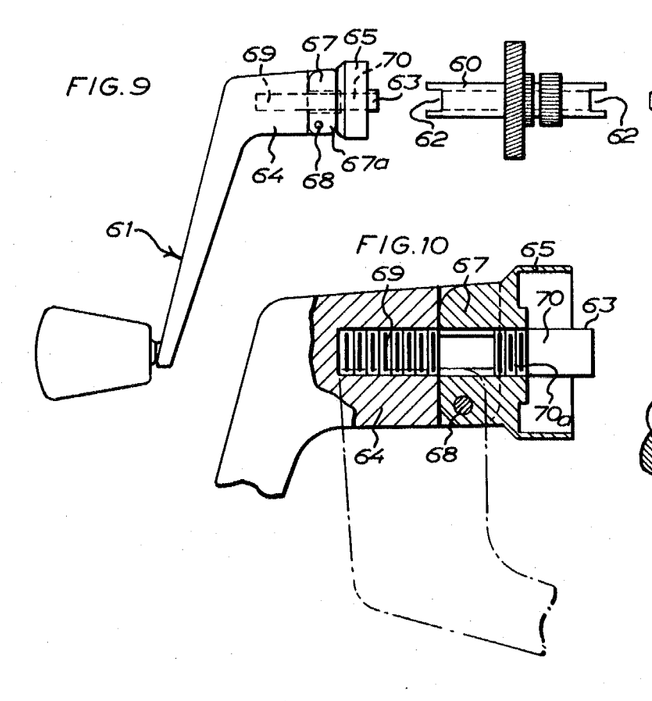
FIG. 9 shows the hand crank with gear wheels and locking screw in the dismantled state, the components being, however, shown in correct relative positions for mounting.
FIGS. 10 and 11, on a larger scale, show some details of the hand crank and its locking screw.
Figure 11:
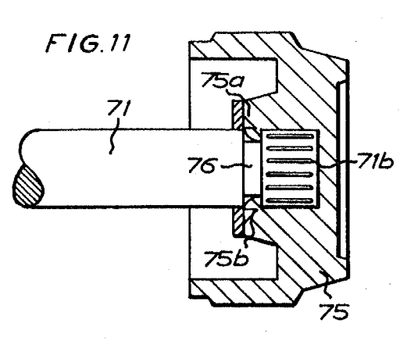

As is shown in FIG. 9, the central portion of the coupling piece 65 is also threaded for engagement with the threaded end portion 71a of the locking screw 71, but this threaded end portion and the threaded portion of the bore 69 and the threaded portion 70a of the bore 70 in the coupling piece 65 are so arranged with respect to each other that the threaded portion of the locking screw 71 leaves the threads of the portion 70a immediately before the threaded portion of the locking screw enters into engagement with the threaded bore 69. When the locking screw 71 is screwed into the threaded bore 69 in the crank arm 64, the arm 64 and the coupling piece 65 are forced against each other to the position shown in FIG. 9, whereupon pivotal movement of the crank arm is prevented. After unscrewing the locking screw 71 from the threaded bore 69 in the crank arm 64, the hand crank can be pivoted to a withdrawn position. It should be noted that the threaded portion 71a of the locking screw may then be received in the unthreaded portion of the bore 70 in the coupling piece 65 which is still held in engagement with the hub sleeve 60. This operation may readily be performed by means of the fingers in that the locking screw 71 has a knurled head 75.

By entirely unscrewing the locking screw 71 from the coupling sleeve 65, the locking screw can be extracted and the hand crank shifted to the opposite side of the reel and thus to the opposite end of the hub sleeve 60 where the hand crank is again connected to the locking screw 71 which is inserted from the opposite side of the reel frame, for instance the lid side through the socket 74a.

By the above-described arrangement of the threads in the crank arm 64 and the coupling piece 65, it is avoided that the screw 71 comes loose by mistake and falls, for instance, into the water. As already mentioned, the threads should be so arranged that the screw does not engage the two threaded portions at the same time, and that the coupling pin 63 need not entirely leave its coupling engagement with the hub 60 in order to permit folding of the crank arm 64.

The sockets 74a, 74b in the reel lid 72 and in the opposite side wall 73 of the reel are relatively short and of a similar configuration such that the fit for the head 75 of the locking screw and for the coupling piece 65 of the crank arm 64 will be identical with respect to these sockets irrespective of whether the crank is mounted for left-hand or right-hand turning.

In order to permit securing the locking screw in a satisfactory manner without using any tools, its knurled head 75 should be of a relatively large diameter for ensuring satisfactory gripping. From the aesthetic point of view, the diameter of the head 75 should correspond approximately to the diameter of the coupling piece 65. Since it is economically disadvantageous to manufacture in a single piece a locking screw with a shaft and a head of this type, the locking screw proper and the head are normally manufactured separately and are then interconnected. It would seem advantageous to use a construction in which the interconnection consists of a rivet which is driven through the head into the outer end portion of the locking screw. Such a construction is however relatively costly and requires in general that the rivet, for aesthetic reasons, is concealed by a plate fixed on the screw head. According to the present invention, however, the connection between the screw head and the screw consists of a grooved end portion 71b of the screw that is driven into a dead bore in a central portion 75a of the head 75, the head being then locked with respect to the screw in that a marginal portion 75b of the central portion 75a of the head is driven into a groove 76 in the end portion of the screw by means of a suitable tool. For this fixing or locking method, the screw head 75 may advantageously consist of aluminium or any suitable light metal alloy.

It should be emphasized that the threaded portion of the locking screw 71 should be so dimensioned with respect to the unthreaded portions of the bores in the crank arm 64 and in the coupling piece 65 that the piece 65 will not leave its coupling engagement when the screw is unscrewed to be brought into engagement only with the threaded coupling piece 65. If the unthreaded portion between the two threaded portions of the members 64, 65 is at most of the same length as the threaded portion of the locking screw or shorter than the coupling pin 63, the coupling pin will maintain its engagement also when the hand crank is folded.

Figure 13:
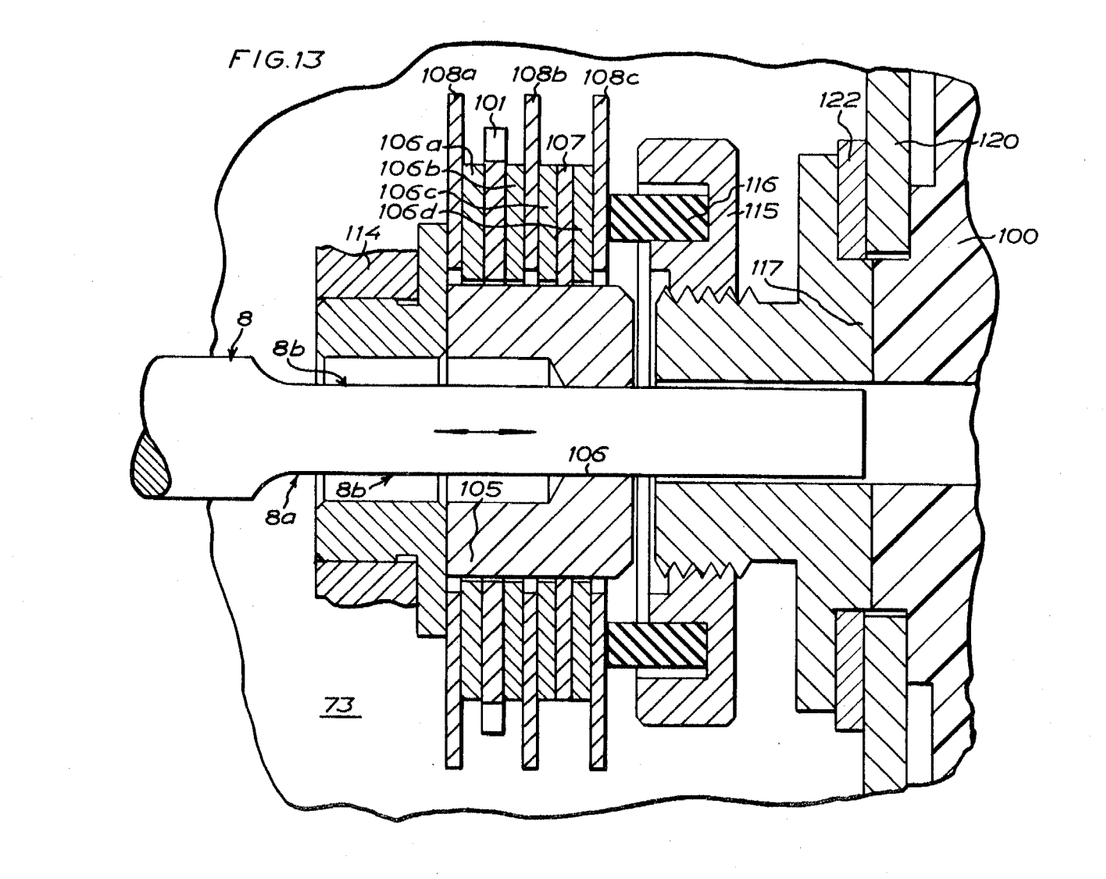
FIG. 13, on a larger scale, shows the brake mechanism for the spool shaft.

As is appreciated from the above, the shaft of the line spool is reciprocated at a rate of movement determined by a cam curve, at the same time as the spool housing with the bail is rotated by means of the hand crank. As is well-known in connexion with fixed-spool reels, the line spool is not rotated by the hand crank, but the spool shaft which is reciprocating in the hollow shaft of the spool housing is nevertheless rotatably mounted with respect both to the spool housing and its shaft and to the driver by means of which the shaft of the line spool is reciprocated. Normally, the shaft of the line spool is held stationary against rotational movement by means of a friction brake which is placed in the rear portion of the gear housing and comprises friction plates which are connected to the rear end portion of the line spool shaft, and stationary friction plates which are connected to the reel frame. The brake mechanism is adjustable by means of a screw device which comprises a knob 100 disposed at the rear end of the reel frame. The brake mechanism, which will be described in greater detail below with reference to FIG. 13, further comprises a toothed wheel 101 which in rotational respect is connected to the shaft of the line spool and which engages with a leaf spring 102 fixed to the inner side of the lid for producing a click signal when the line spool is caused to rotate because the resistance to the winding-up of the line by rotation of the bail by means of the hand crank exceeds the set frictional force between the friction plates.

This friction brake and the device for producing the click signal upon rotation of the line spool are known in principle, but the arrangement used in the fixed-spool reel of the invention is construed in a special manner which affords certain considerable advantages.

The shaft of the line spool is reciprocable in a friction assembly being part of the brake mechanism, but is coupled in frictional respect to the part or parts of the friction assembly which should rotate together with the shaft during the rotation thereof.

Figure 14:
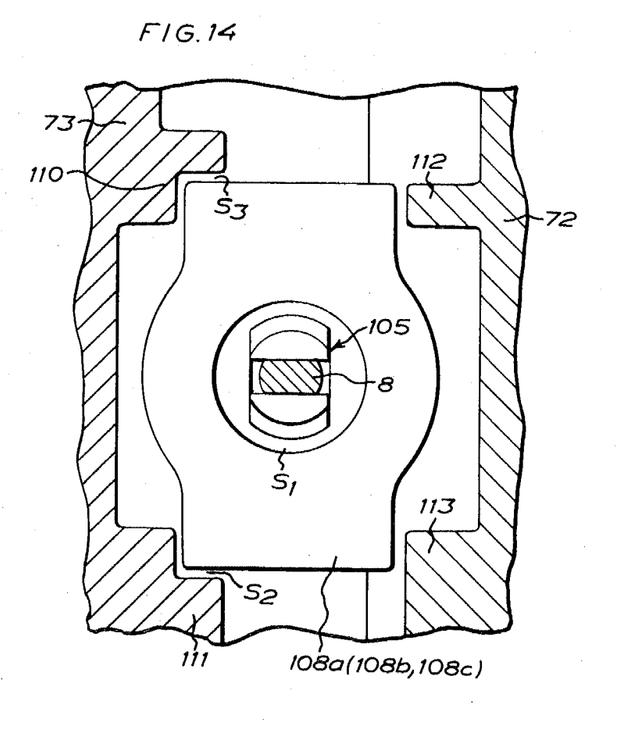
FIG. 14 is a view in a longitudinal section, the mounting of a non-rotatable brake plate of rear part of the reel showing the brake mechanism in the gear housing.

The brake assembly comprises a ring 105 mounted on the spool shaft 8 and in relation to which the spool shaft is axially displaceable but to which it is coupled in rotational respect in that the spool shaft and at least an end portion 106 of the hole in the ring 105 have planar coupling surfaces cooperating with each other. The ring 105 supports the toothed wheel 101 and a number of friction plates 106a–106d and at least a intermediate metal washer 107. The friction plates 106a–106d are supported in an axially displaceable fashion and, which should be noted in particular, freely rotatable on the ring 105 which acts as a compulsory driver only for the toothed wheel 101 and the metal washer 107. The ring 105 can thus be turned by means of the spool shaft 8 and, together with the ring 105, the toothed wheel 101, which also serves as a friction plate, and the metal washer 107 are caused to rotate, whereas the friction plates 106a–106d have such large-sized holes that they are not forcedly driven by the driver or, consequently, by the shaft 8. The fixed plates 108a–108c of the brake, which consist of metal, for instance steel, are non-rotatably but axially displaceably supported in the gear housing between the opposite side walls 72, 73 of the gear housing, one of said walls being the lid 72. The plates 108a–108c have relatively large centre holes (see FIG. 14) so as to go clear of the driver 105 which is rotatable together with the shaft 8, and they abut with one lateral edge on supporting shoulders 110, 111 on the inner side of the stationary gear housing wall 73. These plates may have the general rectangular form as shown in FIG. 14. In order to lock the rotatable steel plates 108a–108c at their opposite lateral edges with respect to the gear housing wall 73, the lid 72 is provided on the inside with abutment shoulders 112, 113.

It should be noted that the inner radial play $S_1$ for the non-rotatable steel plates 108a–108c relative to the circumference of the driver 105 should be sufficiently greater than the radial outer clearances $S_2$, $S_3$ for the non-rotatable steel plates with respect to the shoulders 110, 111 so as to prevent the rotary part of the brake from engaging the non-rotatable plates 108a–108c. Similarly, it should be noted that the friction plates 106a–106d are capable of self-adjustment since they are not forcedly driven, i.e. they can conform to prevailing frictional conditions so as to be able to rotate at the same rate as the spool shaft or remain stationary or rotate at an intermediate r.p.m.

At the axially inner end of the driver ring 105, there is provided in the gear housing a slide or support ring 114 which is fixedly connected to the stationary wall 73 of the gear housing and which has a bearing cavity for the cylindrical surface portions of the rear spool-shaft portion 8a which has two diametrical planar surfaces 8b for engaging the driver ring 105. The ring 114 serves as a front stop for the friction assembly of the brake mechanism, and as a rear stop therefor use is made, according to the invention, of an adjustable ring 115 of for instance brass, which acts against the rear steel plate 108c via a pressure equalizing rubber ring 116 mounted in a groove on the inner side of the brass ring 115. To permit setting of the frictional force of the brake mechanism, the brass ring 115 is axially displaceable by means of the knob 100. To this end, the ring 115 is in the form of a nut which is supported on a screw 117 connected to the knob 100, and in order that the ring/nut 115 should not rotate upon rotation of the knob, the ring/nut is axially guided at its circumference by means of a guide rail 118 which is connected to the reel frame and provides for radially locking the ring/nut 115.

The knob screw 117 extends from the outer side of the gear housing and into the housing through a hole in the rear wall 120 of the gear housing, the screw being axially fixed relative to the wall 120 by means of a locking washer 121.

In the brake mechanism of the invention, the rubber ring 116 serves always to ensure an even braking pressure, which is extremely important in order to avoid a jerky braking action. Unsmooth or jerky braking may arise for instance in that a component in the brake mechanism is warped. Disadvantages of this kind are thus eliminated by the device of the present invention.

It should be noted that the spool shaft 8 during its entire displacement is held, in rotational respect, in engagement with the driver ring 105. Furthermore, it should be emphasized again that the non-rotatable steel plates 108a-108c have diagonal support between the shoulders 110,113 and 111,112, respectively, provided on the inner sides of the gear housing, which permits a certain mobility, however no rotation. A further essential improvement resides in the mode of operation of the friction plates 106a-106d, i.e. they may be caused to rotate together with the driver ring 105 and thus relative to the non-rotatable plates 108a-108c or they may remain stationary with respect to these plates or may be caused to rotate at any intermediary r.p.m. These features make the friction brake work extremely smoothly and without any jerks.

What we claim and desire to secure by Letters Patent is:

1. A fishing reel comprising a body, a line spool (15) which during casting is non-rotating and from which fishing line is unwound in a substantially axial direction, a hand crank (61), a rotatably mounted bail support member (14) connected via transmission means to said hand crank to be rotated thereby, a bail means (20, 26a, 26b) pivotally mounted on said support member to be rotated therewith, spring means (48) acting on said bail means, said bail means being movable against the action of said spring means from an active position for winding up the line on said line spool when said support member (14) is rotated by said hand crank to an inactive position in relation to the line for permitting undisturbed unwinding of the line during casting, a releasable latching mechanism for automatically and releasably locking said bail means (20, 26a, 26b) in its inactive position and for automatically and releasably locking said rotatable bail support member when said bail means is pivoted to its inactive position, wherein said latching mechanism (31, 32, 26a, 35, 41a) includes first engagment means (41, 41a) on said body, second engagement means (26a, 35) supported by and movable with said bail means, and an engaging member (31, 32) for cooperation with said first and second engagement means, said engaging member being movably supported by said rotatable bail support member, means (30, 33) for moving said engaging member from an unengaged position to an engaging position with said first and second engagement means when said bail means is pivoted to its inactive position, and releasing means supported by said body for returning said engaging member to said unengaged position when said rotatable bail supporting member is rotated by said hand crank, said hand crank of the reel optionally mountable for left-hand or right-hand turning, wherein said hand crank for optional coupling to either of the ends (62) of a hub (60) supporting a gear wheel and rotatably mounted in the reel has a crank arm (64) with a coupling piece (65) pivotally mounted to said crank arm, said coupling piece (65) and said crank arm (64) being provided with threaded bores which are coaxial with respect to each other in the normal position of said coupling piece (65) with respect to said crank arm (64), and wherein said crank arm (64), with its said coupling piece (65), after connection to one end of said hub (60) is lockable to said hub by means of a locking screw (71) inserted from the other end of said hub and having a threaded portion (71a) which can be screwed into said threaded bores in said coupling piece (65) and said crank arm (64), the threaded portions of said bores in said crank arm and said coupling piece having an unthreaded spacing of the same length as the threaded portion (71a) of the locking screw (71) such that said locking screw is first screwed into said coupling piece (65) and only when the thread engagement with said coupling piece has ceased, is then screwed into said threaded bore in said crank arm (64) for locking said hand crank in coupled position, and wherein said hand crank is pivotable with respect to said coupling piece (65) when said coupling piece (65) is still connected to said hub (60) while said locking screw (71) is unscrewed from said crank arm (64) and screwed in said coupling piece (65).

2. A fishing reel comprising a body, a line spool (15) which during casting is non-rotating and from which fishing line is unwound in a substantially axial direction, a hand crank (61), a rotatably mounted bail support member (14) connected via transmission means to said hand crank to be rotated thereby, a bail means (20, 26a, 26b) pivotally mounted on said support member to be rotated therewith, spring means (48) acting on said bail means, said bail means being movable against the action of said spring means from an active position for winding up the line on said line spool when said support member (14) is rotated by said hand crank to an inactive position in relation to the line for permitting undisturbed unwinding of the line during casting, a releasable latching mechanism for automatically and releasably locking said bail means (20, 26a, 26b) in its inactive position and for automatically and releasably locking said rotatable bail support member when said bail means is pivoted to its inactive position, wherein said latching mechanism (31, 32, 26a, 35, 41a) includes first engagement means (41, 41a) on said body, second engagement means (26a, 35) supported by and movable with said bail means, and an engaging member (31, 32) for cooperation with said first and second engagement means, said engaging member being movably supported by said rotatable bail support member, means (30, 33) for moving said engaging member from an unengaged position to an engaging position with said first and second engagement means when said ail means is pivoted to its inactive position, and releasing means supported by said body for returning said engaging member to said unengaged position when said rotatable bail supporting member is rotated by said hand crank, said body (13) having a plurality of cam means (55) equiangularly spaced from each other, said cam means preferably having serrated teeth (55), said serrated teeth so designed that one tooth flank (56) serves as a cam surface, whereas the opposite tooth flanks (57) serve as stop means with respect to said engaging member (31, 32).

* * * * *